June 1, 1926.
H. M. CHANCE
1,586,610
METHOD AND APPARATUS FOR CLARIFYING LIQUIDS AND THICKENING MIXTURES
Filed July 22, 1925
2 Sheets-Sheet 2
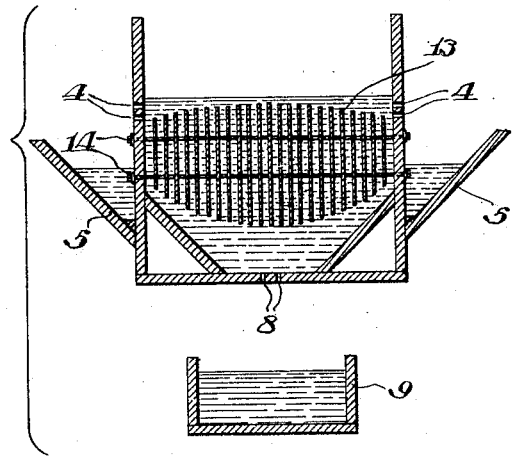
Fig.IV.
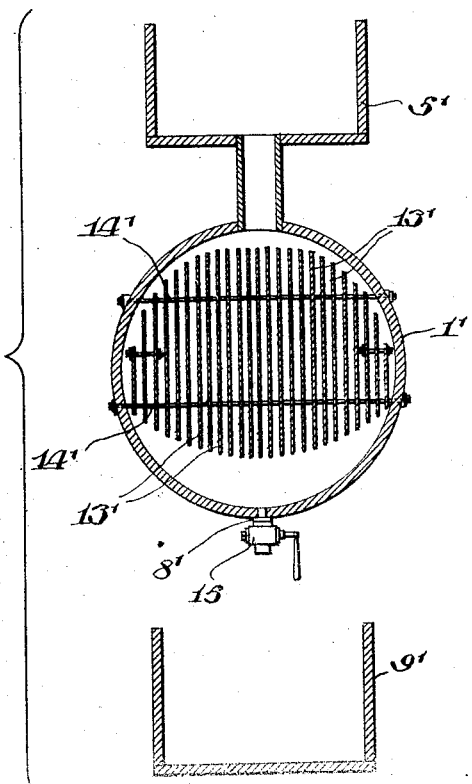
Fig.V.
Witnesses:
Carl K. Schulze
Frank H. Mills
Inventor:
Henry M. Chance Patented June 1, 1926.

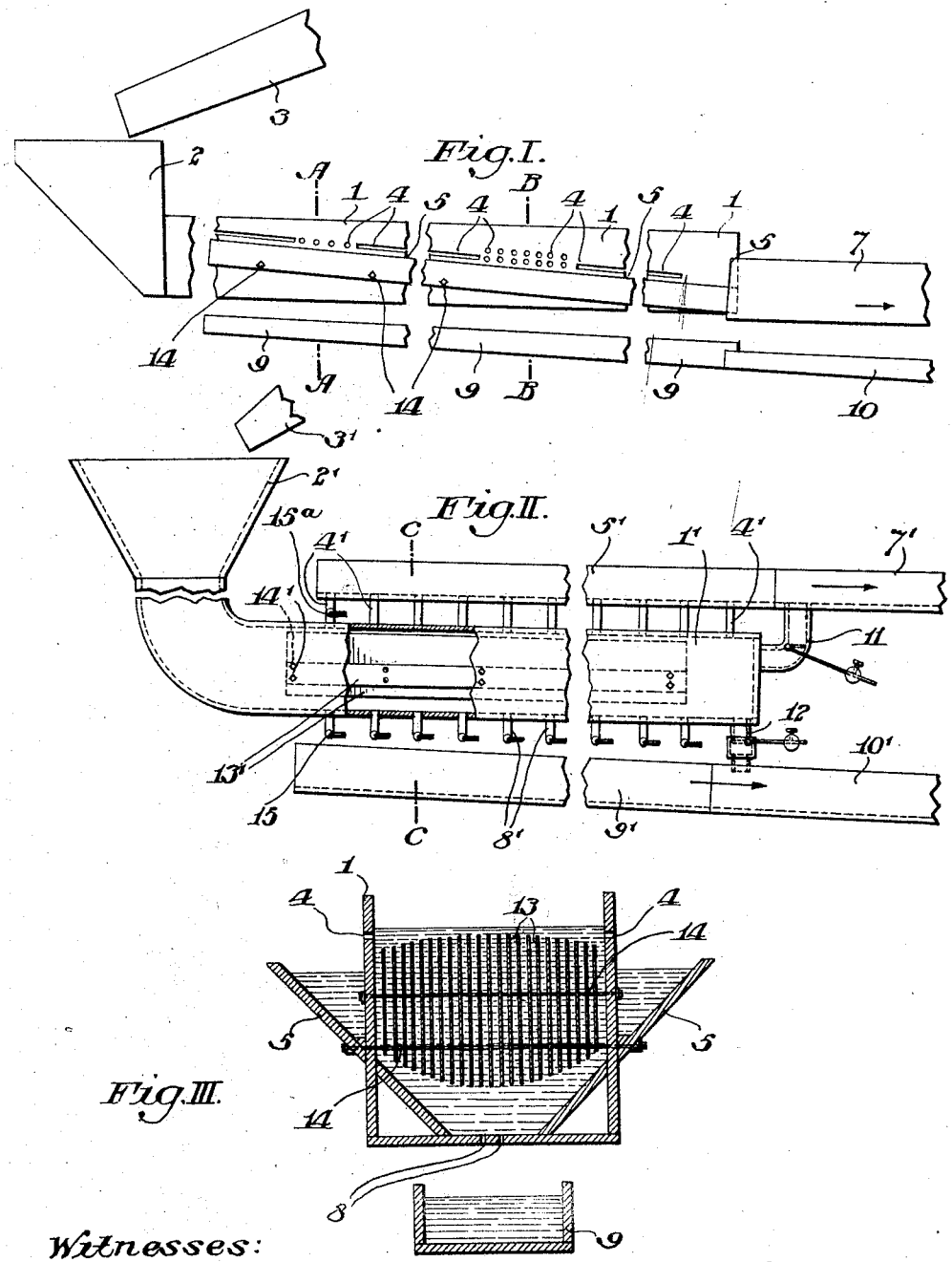

1,586,610

UNITED STATES PATENT OFFICE.

HENRY M. CHANCE, OF PHILADELPHIA, PENNSYLVANIA.

METHOD AND APPARATUS FOR CLARIFYING LIQUIDS AND THICKENING MIXTURES.

Application filed July 22, 1925. Serial No. 45,232.

My invention relates to the division of fluid mixtures of solids and liquids, such as ore pulps and the like, into a clarified or partially clarified liquid, and a thickened mixture of said solids and liquid. It is applicable to those types of clarifiers and thickeners in which such fluid mixture flows at relatively high velocity through a closed or open conduit and in which sedimentation of the solids produces thickening of the mixture in the lower part of the conduit and corresponding clarification of liquid in the upper part of the conduit and in which a thickened product is continuously removed from the lower part of the conduit and clarified or partly clarified liquid is continuously removed from the upper part of the conduit, but I do not herein claim the method or apparatus of this type, as the same has been claimed in an application for "method and apparatus for thickening mixtures and clarifying liquids" filed simultaneously herewith on the 22nd day of July, 1925, Serial No. 45,231.

In this specification and the claims hereof the terms clarify, clarified, clarifying, clarification and the terms thicken, thickened and thickening are used in a comparative sense to mean respectively a decrease in solids that can readily be removed by gravitational settling, and an increase in solids that can readily be effected by gravitational settling without destroying the fluidic properties of the thickened product. In this sense a clarified liquid is therefore not necessarily a clear liquid or one containing no suspended solids but may contain solids of any character that do not prevent its re-use, and a thickened mixture is a mixture in which the solids have been increased without destroying the fluidic properties of the mixture, thus distinguishing such mixture from a non-fluidic deposition or accumulation of solid particles.

In the operation of my present invention I cause the pulp or other material to be thickened and clarified, to flow through an open or closed conduit of any suitable cross-sectional shape, at a velocity sufficient to prevent the accumulation of settled material upon the bottom or lower portion of such conduit, so that material which tends to settle upon the bottom is continuously moving with the flowing stream of pulp or other similar material. The falling of the solid matter towards the bottom of said conduit produces thickening of the material in contact with the bottom of said conduit, and that portion which contains the largest percentage of solids and the smallest percentage of water, is the layer immediately in contact with the bottom of said conduit. This thickened material is removed continuously, and at approximately the same rate at which it is produced, through slots or perforations in or closely adjacent to the bottom of said conduit.

The removal of the thickened material as quickly as thickening is effected, facilitates the settling of further material by bringing the next layer of partly thickened material in close proximity to the bottom of the trough, where, owing to the frictional resistance of the thickened material in contact with the bottom of the trough, the velocity of flow is less than in the zone immediately above this thickened layer, this reduction in velocity of travel increasing the rate at which thickening is effected.

The conduit is made long enough to effect thickening to the desired consistency, with corrresponding clarification of the water flowing in the upper portion of the conduit.

By means similar to those used for the removal of the thickened product from the floor of the conduit, the clarified liquid in the upper part of the conduit is continuously removed, the said means comprising discharge weirs, slots, perforations or holes located at or immediately below the top of the moving stream, to effect continuous discharge of the clarified liquid.

The progressive removal of thickened material from the lower part, and clarified liquid from the top of the flowing stream, reduces the volume of material flowing in the conduit and thus reduces the velocity of flow, a condition favorable both to sedimentation of the finer particles of solids into the thickened product, and the clarification of the upper portion of the moving stream.

In the operation of thickeners and clarifiers of this type the moving stream must flow at a relatively high velocity to keep the thickened mixture moving in the direction of flow, and prevent sedimentation and banking upon the floor of the conduit, the velocity depending upon the specific gravity of the solid material and upon the size and shape of its individual particles. To produce this relatively high velocity at or closely adjacent to the floor of the conduit, the flowing stream must have an average velocity materially greater, with a still greater maximum velocity in the central or upper portion of the conduit. These relatively high velocities produce what in hydraulic practice is termed "turbulent flow" as opposed to "straight line" flow parallel to the walls of the conduit. When turbulent flow is present, straight line flow may exist in the central portion of the moving stream, but a great portion of the moving stream is disturbed by more or less violent eddy currents, swirls, and erratic and irregular movements of the fluid, all of which tend to prevent as rapid and effective settling of the lighter and smaller particles as would occur if the fluid mixture were moving more slowly along lines of "straight line" flow. It is therefore apparent that while the maximum velocity is required in the lower portion of the conduit, the maximum velocity actually exists in a region near the center or upper portion of the moving stream, depending upon whether the conduit be an open or a closed conduit.

To provide conditions more favorable to quiet sedimentation of the solid material my present invention provides means for restraining the velocity of flow in the central and upper portion of the conduit, by dividing the flowing stream into a number of comparatively narrow vertical sheets by the introduction of longitudinal, preferably vertical, thin diaphragms or dividers, the frictional (skin friction) resistance of which reduce the velocity of flow in the central and upper part of the moving stream, with suppression of eddy currents and other irregular movements of the fluid mixture, while permitting the moving stream below these diaphragms and above the floor of the conduit to move at maximum velocity, thus providing conditions favorable to a rapid rate of sedimentation and clarification. The upper portion of the moving stream thus occupies a longer period of time in passing through the conduit, thereby increasing the effectiveness of the conduit both as a thickener of the mixture and a clarifier of the liquid.

Reduction in the velocity of flow by increasing the skin friction resistance can also be effected in greater or lesser degree by changes in the shape of the conduit whereby the surface exposed to the moving stream is increased, and it is apparent that the diaphragms or dividers above described may have horizontal or inclined corrugations or may be replaced by projections from or corrugation of, the walls of the conduit, or by dividing the upper portion of the moving stream among a number of smaller interconnected conduits. In carrying out my invention I therefore do not limit myself to the particular type shown by the drawings, the diaphragms or dividers shown being intended diagrammatically to represent any relatively large surfaces the frictional resistance (skin friction) of which will restrain or reduce the velocity of flow.

In the drawings Fig. I is a vertical longitudinal section and elevation of an open conduit and Fig. II is a similar section and elevation of a closed conduit adapted to incorporate my invention. Figs. III, IV and V are cross-sections illustrating different types of velocity restraining elements by which the velocity of flow in the central and upper portions of said conduits may be controlled within the desired limits.

In Fig. I which illustrates the application of my invention as used in an open trough 1, supplied with fluid mixtures through feed hopper 2, from feed chute 3, provided with weirs illustrated as slots or round hole perforations 4, 4 which provide for the discharge of the clarified liquid into the launders 5, 5, the contents of which discharge into the delivery chute or launder for clarified liquid 7. The enlarged cross-sections, Fig. III and Fig. IV, taken at the lines A—A, and B—B, show apertures 8, 8, in the floor of the trough for the continuous discharge of thickened product, which is conveyed away by launder 9, discharging into delivery chute for thickened product 10. The device for retarding the velocity of flow, consisting of a number of vertical parallel plates is shown by 13, with spacing and supporting bars 14, 14.

The rate of discharge of thickened product through outlets 8, 8, may be regulated by plugging some of these apertures, or by providing them with restrained spigot discharges as illustrated by Fig. II and the enlarged cross-section Fig. V.

In Fig. II the use of a closed conduit of circular cross-section is illustrated, the operation of which will be understood from the foregoing description of the open conduit, like numbers indicating like parts. The outlets for clarified liquid 4', 4', are shown as pipes directly connected with the superposed launder 5', which is shown as an open trough, but which may be replaced by a closed pipe, thereby enabling the delivery of clarified liquid to be made at an elevation but slightly lower than that of the feed hopper 2'. The discharge orifices 8', 8', for thickened product are also shown as pipes, the flow from which may if desired be regulated by the addition of cocks or valves as illustrated by 15; and similar regulation of outlets 4', 4', may be adopted if desired as shown by 15ª. Where the finished products are conveyed away in open troughs, this regulation may more simply be obtained by plugging or partially plugging a sufficient number of the outlets to secure the desired rate of discharge from different portions of the separating conduit. The end of the conduit 1' is shown as closed, but provided with two valved outlets 11 and 12, which may consist of weighted check valves to control the pressure in conduit 1', and to provide for the discharge, from the end of the conduit, of the clarified liquid and/or thickened product into delivery conduits 7' and 10'.

The device for retarding the velocity of flow in the upper part of conduit 1' is shown by 13', and consists of a number of vertical plates, held by spacing rod supports 14', spaced close enough together to sufficiently retard the velocity of flow in the upper part of the conduit while permitting the material to flow at much higher velocity in the lower part of the conduit 1', thus insuring the maintenance of continuous movement of the thickened product in the lower part of the conduit.

The surface friction of the plates of the retarding elements 13, 13', is relied upon to effect the desired retardation of the velocity of flow, while permitting all solid matter in the liquid between these plates to fall freely to the lower portion of the conduit. It is therefore important that the construction of retarding devices of this character be such as will not tend to produce eddy currents or vertical flow of the liquid within the region occupied by the retarding device. The plates or partitions 13, 13', are shown as flat plates, but the use of flat plates is not essential, as corrugated plates or curved plates may also be used in such retarders, but if such plates be used all portions of such curved or corrugated surfaces should be steep enough to prevent the accumulation of sediments thereon.

A large superficial area of such plates is required to produce substantial retardation in the velocity of flow by the frictional resistance of surfaces parallel to the direction of flow, and this can be obtained either by inserting the maximum number of plates that can be placed in the apparatus, or by using a smaller number of plates of greater length. It will be understood that the distance between any two adjacent plates must be somewhat greater than the diameter of the largest of the particles of solid material upon which the apparatus is designed to operate, otherwise the spaces between the plates will become clogged with solid matter and proper functioning will cease, all of which will be understood by those skilled in the art.

As many different forms of construction may be used in apparatus for the operation of my invention I do not limit myself to the particular construction shown by the drawings, these being intended to be diagrammatically illustrative of constructions such as may be used in carrying out my invention as herein described.

Having described my invention I claim,

1. A method for clarifying the liquid constituent of mixtures of liquid and comminuted solids heavier than said liquid and substantially insoluble therein and for thickening a portion of said mixture, which consists in providing a body of such mixture having a length materially greater than its depth; in imparting a substantially quiescent movement of longitudinal translation to said body; in reducing the velocity of the central portion of said body by dividing said central portion into a plurality of substantially parallel, vertical, longitudinal sheets, which are in free and unobstructed connection with other portions of said body, whereby the velocity of translation of said central portion is relatively less than the velocity of translation in the other portions of said body; in maintaining relatively high velocity of translation in the lower part of said body, whereby solids settling by gravitation upon entering the lower part of said body, produce thickening thereof and said thickened portion is by the motion of translation maintained in a fluidic condition; in removing during said translation thickened product from said lower portion, and in simultaneously removing clarified liquid from the upper portion of said body.

2. Apparatus for clarifying the liquid constituent of mixtures of liquid and comminuted solids heavier than said liquid and substantially insoluble therein for thickening a portion of said mixture, comprising in combination, a conduit adapted to permit the movement therethrough of a substantially quiescent flowing stream of mixture of the described type, said conduit having a length substantially greater than its vertical depth; means for imparting a substantially quiescent motion to mixture contained therein, whereby a motion of longitudinal translation therethrough is imparted to said mixture; means for reducing the velocity in the central part of said conduit, said means comprising a plurality of substantially parallel, vertical, longitudinal dividers, located in the central part of said conduit, whereby the central portion of mixture in said conduit is divided into a plurality of parallel, vertical, longitudinal sheets which are in substantially unobstructed contact with other portions of said mixture, thus reducing the velocity of translation in the central part of said mixture by the skin-friction resistance due to contact of said sheets with said dividers, and whereby solids settling by gravitation from said sheets and entering the lower part of said mixture produce thickening thereof, and whereby the higher velocity of translation in said lower portion maintains said thickened product in a fluidic condition; means for removing said thickened product from the lower part of said conduit, said means being substantially coextensive with the operative portion of said conduit and means for removing clarified liquid from the upper part of said conduit.

Signed at Philadelphia, Pa., this 21st day of July, 1925.

HENRY M. CHANCE.